US012739871B2

(12) United States Patent
Lin et al.

(10) Patent No.: US 12,739,871 B2
(45) Date of Patent: Sep. 15, 2026

(54) DATA TRANSMISSION METHOD AND TERMINAL DEVICE

(71) Applicant: GUANGDONG OPPO MOBILE TELECOMMUNICATIONS CORP., LTD., Dongguan (CN)

(72) Inventors: Xue Lin, Dongguan (CN); Cong Shi, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 436 days.

(21) Appl. No.: 18/167,028

(22) Filed: Feb. 9, 2023

(65) Prior Publication Data

US 2023/0189349 A1 Jun. 15, 2023

Related U.S. Application Data

(63) Continuation of application No. PCT/CN2020/119675, filed on Sep. 30, 2020.

(51) Int. Cl.
*H04W 74/00* (2009.01)
*H04W 76/10* (2018.01)
(Continued)

(52) U.S. Cl.
CPC ......... *H04W 74/002* (2013.01); *H04W 76/10* (2018.02); *H04W 74/0833* (2013.01); *H04W 74/0836* (2024.01)

(58) Field of Classification Search
CPC ............ H04W 74/0833; H04W 76/10; H04W 74/002
See application file for complete search history.

(56) References Cited

U.S. PATENT DOCUMENTS

2018/0139778 A1 5/2018 Chou
2019/0246318 A1* 8/2019 Kim ...................... H04W 48/08
(Continued)

FOREIGN PATENT DOCUMENTS

CN 110022567 A 7/2019
CN 111083752 A 4/2020
WO 2018086600 A 5/2018

OTHER PUBLICATIONS

Huawei, HiSilicon, "Common aspects between RACH and CG-based scheme", R2-2006582, 3GPP TSG-RAN WG2 Meeting #111-e Electronic, Aug. 17-28, 2020, all pages.
(Continued)

*Primary Examiner* — Michael Thier
*Assistant Examiner* — Tracy Lauren Raimondo
(74) *Attorney, Agent, or Firm* — Ladas & Parry, LLP

(57) ABSTRACT

Embodiments of the present application provide a data transmission method and a terminal device, which can realize continuous inactive-state small data transmission. The data transmission method includes: sending, by a terminal device, first information during running of a first timer, where the terminal device is in an inactive state, the first timer is used to represent a time window of RRC connection establishment resume and/or to represent a time window for monitoring information for scheduling uplink data and/or downlink data transmission, and the first information includes user data; and restarting, by the terminal device, the first timer in a case that the terminal device receives second information, where the second information is used to schedule the terminal device to transmit uplink data and/or receive downlink data in the inactive state.

16 Claims, 7 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2019/0268754 | A1 | 8/2019 | Barrett | |
| 2020/0128484 | A1 | 4/2020 | Su et al. | |
| 2020/0187245 | A1* | 6/2020 | Fujishiro | H04W 72/21 |
| 2020/0337089 | A1* | 10/2020 | Ren | H04W 74/0833 |
| 2020/0367310 | A1* | 11/2020 | Jung | H04W 76/15 |
| 2021/0315049 | A1* | 10/2021 | Wei | H04W 76/27 |
| 2021/0410180 | A1* | 12/2021 | Tsai | H04L 1/1819 |
| 2022/0225395 | A1* | 7/2022 | Xu | H04L 1/1864 |
| 2022/0225465 | A1* | 7/2022 | Xu | H04W 76/27 |
| 2022/0232659 | A1* | 7/2022 | Kim | H04W 76/28 |

OTHER PUBLICATIONS

Ericsson, "Timer for RRC Resume Request (T319)," R2-1818454, 3GPP TSG-RAN WG2#104, Spokane,Washington, USA, Nov. 12-16, 2018, all pages.

Samsung, Intel Corporation, "Harmonised two step reconnection(re-establishment and resume)", R2-1807834, 3GPP TSG-RAN WG2 #102, Busan, Korea, May 21-25, 2018, all pages.

The Extended European Search Report of the corresponding European patent application No. 20955794.1, dated Jul. 5, 2023.

The second Office Action of corresponding European patent application No. 20955794.1, dated Apr. 19, 2024.

Mikko Saily et al: "5G Asynchronous Control Functions and Overall Control Plane Design", METIS-11—Mobile and wireless communications Enablers for the Twenty-twenty Information Society—II, Apr. 30, 2017 (Apr. 30, 2017), XP055443623.

The first Office Action of corresponding European application No. 20955794.1, dated Jan. 19, 2024.

International Search Report (ISR) dated May 26, 2021 for Application No. PCT/CN2020/119675 and its English translation provided by WIPO.

Written Opinion (WOSA) dated May 26, 2021 for Application No. PCT/CN2020/119675 and its English translation provided by WIPO.

Ericsson, "Baseline solution for small data transmission in RRC_Inactive", R2-168713, 3GPP TSG-RAN WG2 #96, Reno, Nevada, USA, Nov. 14-18, 2016, all pages.

ETSI MCC, "Report of 3GPP TSG RAN2#111-e meeting", Online, R2-2008xxx, 3GPP TSG-RAN WG2 meeting #112-e, Aug. 17-28, 2020, all pages.

ZTE Corporation, "Work Item on NR smalldata transmissions in Inactive state", RP-193252, 3GPP TSG RAN Meeting #86, Sitges, Spain, Dec. 9-12, 2019, all pages.

Huawei, HiSilicon, "UL data transmission in RRC_Inactive", R2-168544, 3GPP TSG-RAN WG2 #96, Reno, Nevada, USA, Nov. 14-18, 2016, all pages.

* cited by examiner

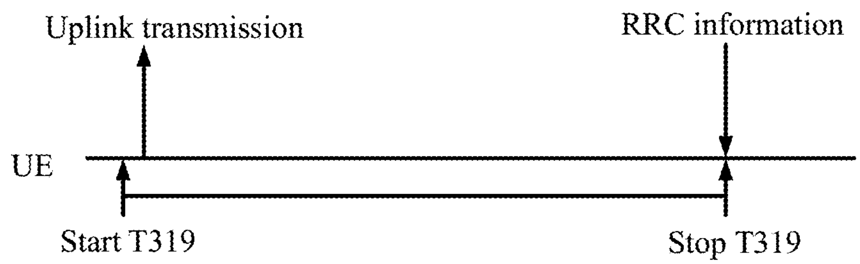

FIG. 9

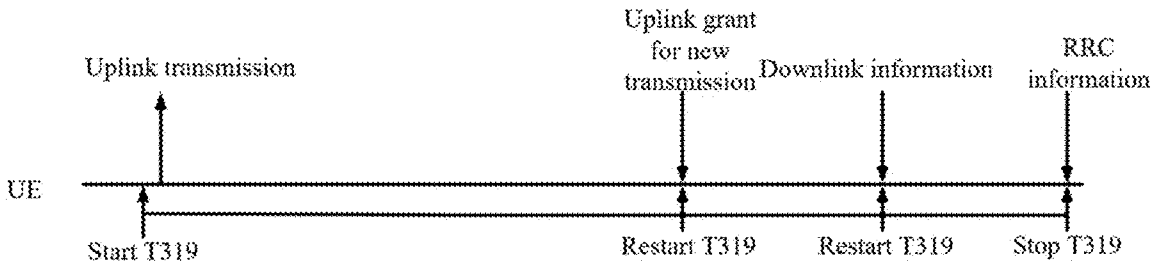

A terminal device sends first information during running of a first timer, where the terminal device is in an inactive state, the first timer is used to represent a time window of RRC connection establishment resume, and the first information includes user data — S310

The terminal device starts or restarts a second timer in a case that the terminal device receives second information after the first information, where the second information is used to schedule the terminal device to transmit uplink data and/or receive downlink data in the inactive state, and the second timer is used to represent a time window for the terminal device to monitor information for scheduling uplink data and/or downlink data transmission and/or to represent a time window of RRC connection establishment resume — S320

FIG. 11

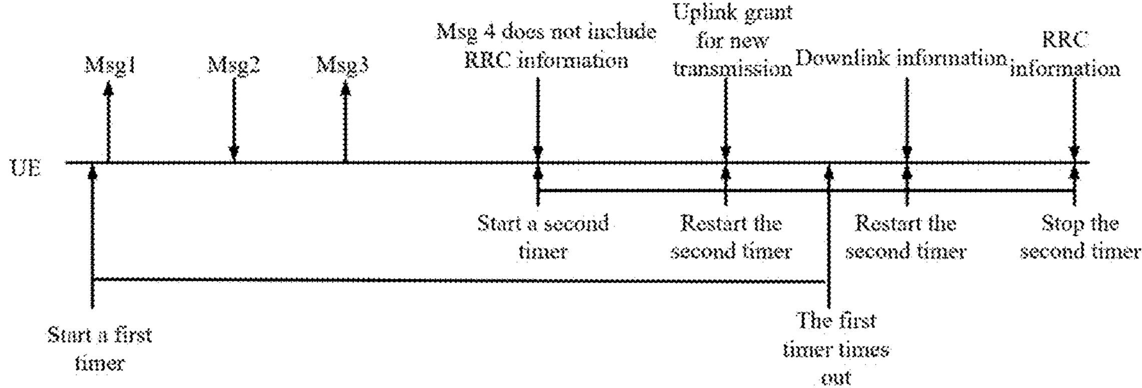
FIG. 12
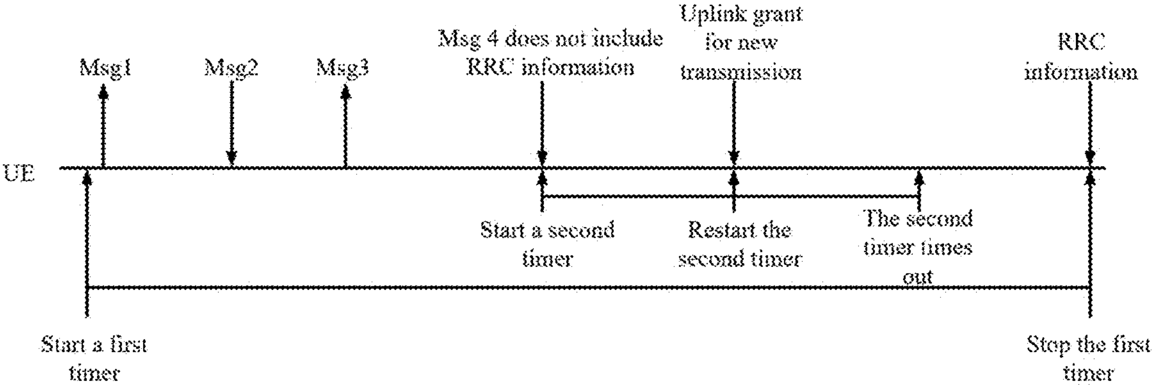
FIG. 13
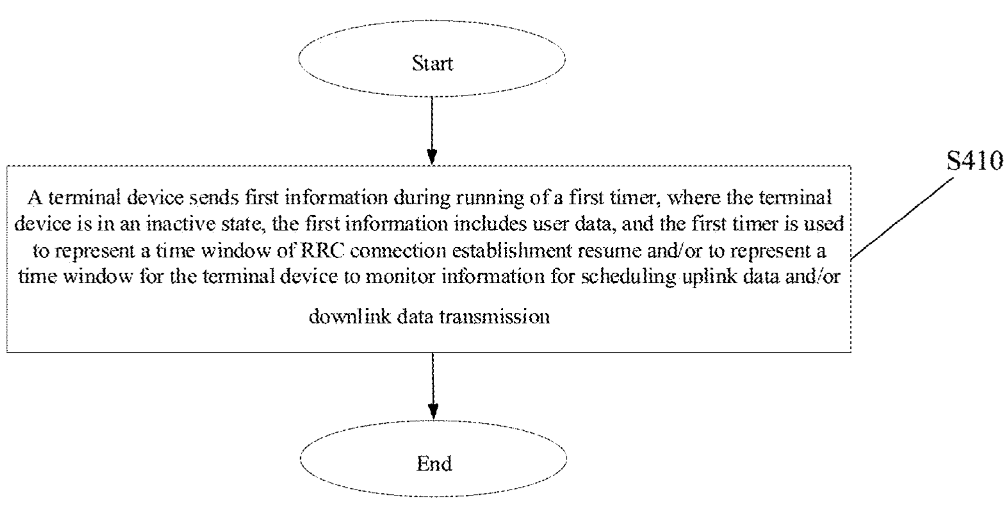
FIG. 14

DATA TRANSMISSION METHOD AND TERMINAL DEVICE

CROSS-REFERENCE TO RELATED APPLICATION

This application is a continuation of International Application No. PCT/CN2020/119675, filed on Sep. 30, 2020, the content of which is incorporated herein by reference in its entirety.

TECHNICAL FIELD

Embodiments of the present application relates to the field of communication and, in particular, to a data transmission method and a terminal device.

BACKGROUND

In radio resource control (RRC) connection establishment resume, after transmitting an RRC resume request (RRCResumeRequest), a terminal device starts a timer T319, and after receiving RRC resume information (RRCResume), the terminal device stops the timer T319. When the timer T319 times out, the terminal device enters an idle state, and records connection establishment resume failure information. In addition, in a new radio (NR) system, multiple times of uplink (UL)/downlink DL) data transmission are supported in a same small data transmission (SDT) process, and an RRC state of the terminal device does not change. In this case, how to realize SDT of a terminal device in an inactive state is an urgent problem to be solved.

SUMMARY

Embodiments of the present application provide a data transmission method and a terminal device, which can realize continuous inactive-state small data transmission.

In a first aspect, a data transmission method is provided, and the method includes:

sending, by a terminal device, first information during running of a first timer, where the terminal device is in an inactive state, the first timer is used to represent a time window of RRC connection establishment resume and/or to represent a time window for monitoring information for scheduling uplink data and/or downlink data transmission, and the first information includes user data;

restarting, by the terminal device, the first timer in a case that the terminal device receives second information, where the second information is used to schedule the terminal device to transmit uplink data and/or receive downlink data in the inactive state.

In a second aspect, a data transmission method is provided, and the method includes:

sending, by a terminal device, first information during running of a first timer, where the terminal device is in an inactive state, the first timer is used to represent a time window of RRC connection establishment or RRC connection establishment resume, and the first information includes user data;

starting or restarting, by the terminal device, a second timer in a case that the terminal device receives second information after the first information, where the second information is used to schedule the terminal device to transmit uplink data and/or receive downlink data in the inactive state, and the second timer is used to represent a time window for the terminal device to monitor information for scheduling uplink data and/or downlink data transmission and/or to represent a time window of RRC connection establishment resume.

In a third aspect, a data transmission method is provided, and the method includes:

sending, by a terminal device, first information during running of a first timer, where the terminal device is in an inactive state, the first information includes user data, and the first timer is used to represent a time window of RRC connection establishment resume and/or to represent a time window for the terminal device to monitor information for scheduling uplink data and/or downlink data transmission.

In a fourth aspect, a terminal device is provided to execute the method according to the first aspect.

Specifically, the terminal device includes functional modules for executing the method according to the first aspect.

In a fifth aspect, a terminal device is provided to execute the method according to the second aspect.

Specifically, the terminal device includes functional modules for executing the method according to the second aspect.

In a sixth aspect, a terminal device is provided to execute the method according to the third aspect.

Specifically, the terminal device includes a functional module for executing the method according to the third aspect.

In a seventh aspect, a terminal device including a processor and a memory is provided. The memory is configured to store a computer program, and the processor is configured to call and run the computer program stored in the memory to execute the method according to the first aspect.

In an eighth aspect, a terminal device including a processor and a memory is provided. The memory is configured to store a computer program, and the processor is configured to call and run the computer program stored in the memory to execute the method according to the second aspect.

In a ninth aspect, a terminal device including a processor and a memory is provided. The memory is configured to store a computer program, and the processor is configured to call and run the computer program stored in the memory to execute the method according to the third aspect.

In a tenth aspect, an apparatus is provided to implement the method according to any one of the first aspect to the third aspect.

Specifically, the apparatus includes a processor for calling and running a computer program from a memory to cause a device installed with the apparatus to execute the method according to any one of the first aspect to the third aspect.

In an eleventh aspect, a computer-readable storage medium is provided for storing a computer program, and the computer program causes a computer to execute the method according to any one of the first aspect to the third aspect.

In a twelfth aspect, a computer program product including computer program instructions is provided, and the computer program instructions cause a computer to execute the method according to any one of the first aspect to the third aspect.

In a thirteenth aspect, a computer program is provided, and the computer program, when run on a computer, causes the computer to execute the method according to any one of the first aspect to the third aspect.

According to the technical solution of the first aspect above, after inactive-state small data transmission of the first time, if the terminal device receives indication information from a network device to schedule the terminal device to transmit uplink data and/or receive downlink data in the inactive state, the terminal device restarts the first timer. That is, the first timer does not restrict the inactive-state small data transmission, so that continuous inactive-state small data transmission can be realized.

According to the technical solution of the second aspect above, after inactive-state small data transmission of the first time, if the terminal device receives indication information from a network device to schedule the terminal device to transmit uplink data and/or receive downlink data in the inactive state, the terminal device starts or restarts the second timer. That is, by introducing the second timer, continuous inactive-state small data transmission can be realized.

According to the technical solution of the third aspect above, by redefining a function of the first timer, the first timer will not restrict inactive-state small data transmission, so that continuous inactive-state small data transmission can be realized.

BRIEF DESCRIPTION OF DRAWINGS

FIG. 9 is still another schematic diagram of starting and stopping a first timer provided by an embodiment of the present application.

FIG. 10 is still another schematic diagram of starting, restarting and stopping a first timer provided by an embodiment of the present application.

FIG. 11 is a schematic flowchart of another data transmission method provided by an embodiment of the present application.

FIG. 12 is a schematic diagram of starting, restarting and stopping a first timer and a second timer provided by an embodiment of the present application.

FIG. 13 is another schematic diagram of starting, restarting and stopping a first timer and a second timer provided by an embodiment of the present application.

FIG. 14 is a schematic flowchart of still another data transmission method provided by an embodiment of the present application.

DESCRIPTION OF EMBODIMENTS

Figure 1:
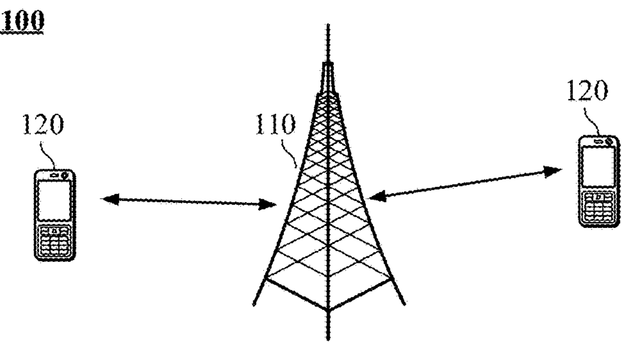
FIG. 1 is a schematic diagram of a communication system architecture provided by an embodiment of the present application.

The technical solutions in embodiments of the present application will be described in combination with accompanying drawings in the embodiments of the present application. Obviously, the described embodiments are only part of the embodiments of the present application, not all of them. Based on the embodiments of the present application, all other embodiments obtained by those skilled in the art without creative effort belong to the protection scope of the present application.

The technical solutions of the embodiments of the present application can be applied to various communication systems, such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a 5th-generation communication (5G) system or other communication systems.

Generally speaking, the number of connections supported by a traditional communication system is limited and easy to implement. However, with development of communication technology, a mobile communication system will not only support traditional communication, but also support, for example, device to device (D2D) communication, machine to machine (M2M) communication, machine type communication (MTC), vehicle to vehicle (V2V) communication, or vehicle to everything (V2X) communication, etc. The embodiments of the present application may also be applied to these communication systems.

In an implementation, a communication system in the embodiments of the present application may be applied to a carrier aggregation (CA) scenario, a dual connectivity (DC) scenario and a standalone (SA) network deployment scenario.

In an implementation, a communication system in the embodiments of the present application may be applied to an unlicensed spectrum, and the unlicensed spectrum may also be considered as a shared spectrum; or, a communication system in the embodiments of the present application may also be applied to a licensed spectrum, and the licensed spectrum may also be considered as a non-shared spectrum.

The embodiments of the present application describe various embodiments in combination with a network device and a terminal device, where the terminal device may also be called a user equipment (UE), an access terminal, a user unit, a user station, a mobile radio station, a mobile station, a remote station, a remote terminal, a mobile device, a user terminal, a terminal, a wireless communication device, a user agent or a user apparatus, etc.

The terminal device may be a station (ST) in a WLAN, a cellular phone, a cordless phone, a session initiation protocol (SIP) phone, a wireless local loop (WLL) station, a personal digital assistant (PDA) device, a handheld device with a wireless communication function, a computing device with a wireless communication function or other processing devices connected to a wireless modem, an in-vehicle device, a wearable device, a terminal device in a next-generation communication system such as NR network, or a terminal device in a future-evolved public land mobile network (PLMN), etc.

In the embodiments of the present application, the terminal device may be deployed on land, including indoor or outdoor, handheld, wearable or vehicle-mounted; may also be deployed on the water (such as on a ship, etc.); and may also be deployed in the air (such as on an aircraft, a balloon, a satellite, etc.).

In the embodiments of the present application, the terminal device may be a mobile phone, a tablet computer (Pad), a computer with a wireless transceiving function, a virtual reality (VR) terminal device, an augmented reality (AR) terminal device, a wireless terminal device in industrial control, a wireless terminal device in self driving, a remote medical wireless terminal device, a wireless terminal device in smart grid, a wireless terminal device in transportation safety, a wireless terminal device in smart city or a wireless terminal device in smart home, etc.

As an example rather than a limitation, in the embodiments of the present application, the terminal device may also be a wearable device. The wearable device may also be called a wearable smart device, which is a general name of wearable devices that are developed by performing intelligent design on daily wear using wearable technology, such as glasses, gloves, watches, clothing and shoes. The wearable device is a portable device that is worn directly on a body or integrated into a user's clothing or accessories. The wearable device is not only a hardware device, but also realizes powerful functions through software support, data interaction and cloud interaction. In a broad sense, wearable smart devices include those full-featured and large-sized with complete or partial functions being achieved without relying on smart phones, such as smart watches or smart glasses, and those focusing on only a certain type of application functions and required to be used in cooperation with other devices such as smart phones, such as various kinds of smart bracelets and smart jewelry for physical sign monitoring.

In the embodiments of the present application, the network device may be a device used to communicate with a mobile device. The network device may be an access point (AP) in WLAN, a base station (BTS) in GSM or CDMA, a base station (NodeB, NB) in WCDMA, an evolutional base station (Evolutional Node B, eNB or eNodeB) in LTE, a relay station or access point, an in-vehicle device, a wearable device, a network device or a base station (gNB) in an NR network, a network device in a future-evolved PLMN, or a network device in an NTN, etc.

As an example rather than a limitation, in the embodiments of the present application, the network device may have a mobile characteristic, for example, the network device may be a mobile device. In an implementation, the network device may be a satellite or a balloon station. For example, the satellite may be a low earth orbit (LEO) satellite, a medium earth orbit (MEO) satellite, a geosynchronous earth orbit (GEO) satellite, a high elliptical orbit (HEO) satellite, etc. In an implementation, the network device may also be a base station disposed on land, in water and other places.

In the embodiments of the present application, the network device may provide services for a cell, and the terminal device communicates with the network device through transmission resources (e.g., frequency domain resources, or spectrum resources) used by the cell. The cell may be a cell corresponding to the network device (e.g., a base station), and the cell may belong to a macro base station or a base station corresponding to a small cell. The small cell here may include: a metro cell, a micro cell, a pico cell, a femto cell, etc. These small cells have characteristics of small coverage and low transmit power, and are suitable for providing high-speed data transmission services.

Exemplarily, a communication system 100 to which embodiments of the present application is applied is shown in FIG. 1. The communication system 100 may include a network device 110, and the network device 110 may be a device that communicates with terminal devices 120 (or called communication terminals, terminals). The network device 110 may provide a communication coverage for a specific geographical area, and may communicate with terminal devices located in the coverage area.

FIG. 1 exemplarily shows one network device and two terminal devices. In an implementation, the communication system 100 may include multiple network devices, and other number of terminal devices may be included within a coverage area of each network device, which is not limited in the embodiments of the present application.

In an implementation, the communication system 100 may also include a network controller, a mobility management entity and other network entities, which are not limited in the embodiments of the present application.

It should be understood that a device with a communication function in a network/system in the embodiments of the present application may be called a communication device. Taking the communication system 100 shown in FIG. 1 as an example, the communication device may include the network device 110 and the terminal devices 120 with communication functions, and the network device 110 and the terminal devices 120 may be specific devices as described above, which will not be repeated here. The communication device may also include other devices in the communication system 100, such as a network controller, a mobility management entity and other network entities, which are not limited in the embodiments of the present application.

It should be understood that the terms "system" and "network" are often used interchangeably herein. The term "and/or" herein is only an association relationship for describing associated objects, which means that there can be three kinds of relationships. For example, "A and/or B" can mean that there are three situations: A exists alone, A and B exist at the same time, and B exists alone. In addition, the character "/" herein generally means that associated objects before and after the character are in an "or" relationship.

Terms used in the embodiments of the present application are only used to explain specific embodiments of the present application, and are not intended to limit the present application. Terms such as "first", "second", "third" and "fourth" in the description, claims and the accompanying drawings of the present application are used to distinguish different objects, rather than to describe a specific order. In addition, the terms "include" and "have" and any variations thereof are intended to cover non-exclusive inclusion.

It should be understood that the "indication" mentioned in the embodiments of the present application may be a direct indication, an indirect indication, or represent having an association relationship. For example, "A indicates B" can mean that A indicates B directly, for example, B can be obtained through A; can also mean that A indicates B indirectly, for example, A indicates C, and B can be obtained through C; and can also mean that there is an association relationship between A and B.

In the description of the embodiments of the present application, the term "corresponding" can mean that there is a direct correspondence or an indirect correspondence between the two, or that there is an association relationship between the two, or a relationship of indicating and being indicated, of configuring and being configured, or the like.

In the embodiments of the present application, the "predefined" can be realized by pre-storing corresponding codes, tables or other forms that can be used to indicate relevant information in a device (for example, including a terminal device and a network device), and the present application is not limited in terms of its specific implementation. For example, being predefined may refer to being defined in a protocol.

In the embodiments of the present application, the "protocol" may refer to a standard protocol in the field of communication, including, for example, an LTE protocol, an NR protocol and related protocols applied in future communication systems, which is not limited in the present application.

In order to better understand the embodiments of the present application, a small data transmission related to the present application will be described.

Figure 2:
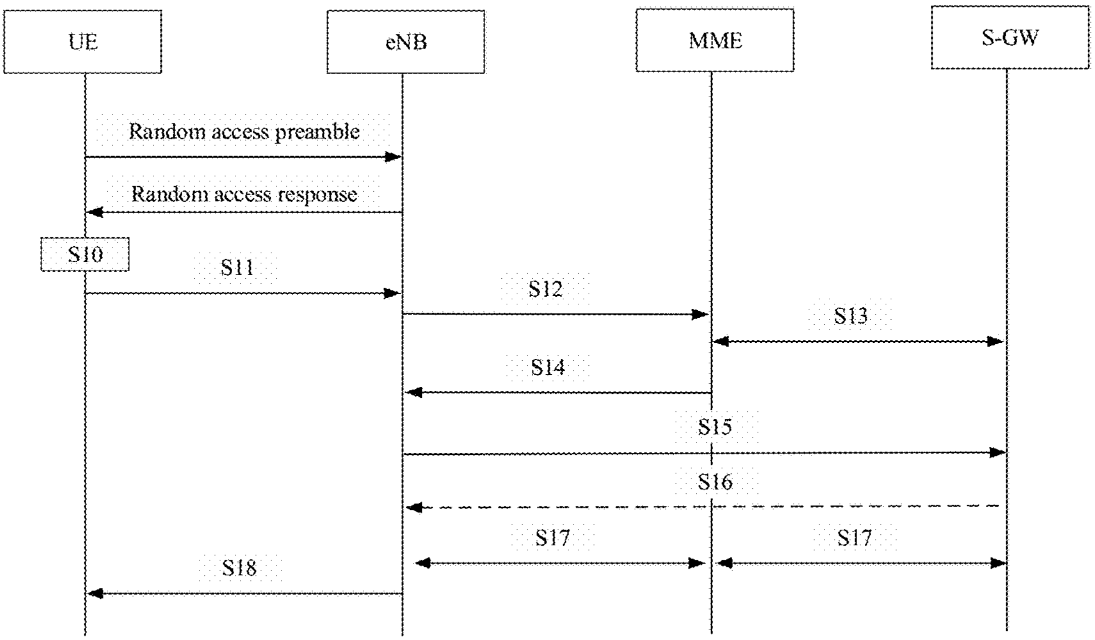
FIG. 2 is a schematic diagram of an EDT provided by the present application.

In LTE, early data transmission (EDT), i.e., small data transmission, is introduced. In this process, a UE may always remain in an idle state, a suspend state or an inactive state to complete a transmission of uplink and/or downlink small data packets. For example, as shown in FIG. 2, a process of a user plane transmission solution is described in S10 to S18.

S10: a UE selects one preamble from a preamble group used for indicating EDT and sends it to an eNB to initiate an EDT transmission process. After receiving the corresponding preamble, the eNB configures for the UE uplink resources and timing advance (TA) for EDT through a random access response (RAR).

S11, the UE sends an RRC connection resume request (ConnectionResumeRequest) message to the eNB, which includes a resume identity (ID), an establishment cause, and a message authentication code for integrity (MAC-I) for short resume (shortResumeMAC-I). The UE side resumes all signaling radio bearers (SRBs) and data radio bearers (DRBs), and derives a new key through a next hop chaining counter (NCC) included in a connection release message of the last time. User data is encrypted and transmitted on a dedicated transmission channel (DTCH) and multiplexed with RRCConnectionResumeRequest.

S12, the eNB establishes an S1 connection, initiates a context resume process to a mobility management entity (MME), and reactivates a bearer between S1-U.

S13, the MME initiates a request to a serving gateway (S-GW) to reactivate a bearer between UE S1-U for subsequent user data delivery to the S-GW.

S14, the MME confirms to the eNB to resume UE context.

S15, deliver the user data to the S-GW.

S16, if the S-GW has downlink data to send at this time, the S-GW delivers the downlink data to the eNB.

S17, the eNB suspends the S1 connection, and the MME inactivates the bearer between UE S1-U.

S18, the eNB sends an RRC connection release (RRCConnectionRelease) message to the UE to keep the UE in a suspend state.

For the above data transmission, in fact, the UE has completed the transmission of small data packets without entering a connected state. On configuration, a network will configure a maximum transport block (TB) size permitted by the current network on a system information block (SIB) 2, and the UE determines an amount of data to be transmitted. If the amount is less than this broadcasted maximum TB size, the UE can initiate EDT. On the contrary, the UE uses a normal connection establishment process and enters the connected state to transmit data.

In order to better understand the embodiments of the present application, a preconfigured uplink resource (PUR) related to the present application will be described.

Figure 3:
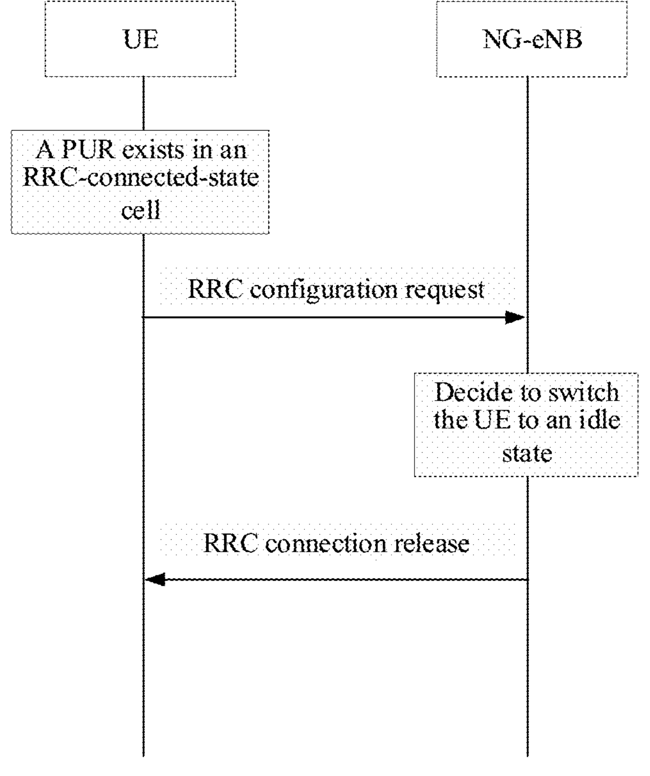
FIG. 3 is a schematic diagram of a PUR configuration request provided by the present application.

In LTE release 16 (Release16), a data transmission method using a PUR in an IDLE state is introduced for a narrow band internet of things (NB-IoT) scenario and an enhanced machine type communication (eMTC) scenario. FIG. 3 shows a process that a UE sends a PUR configuration request and receives a network PUR configuration. When a cell where the UE is located supports PUR transmission, the UE can request a PUR through a PUR configuration request (PURConfigurationRequest) in the connected state, and the PURConfigurationRequest can selectively include a PUR period, a TB size, the number of PURs, etc. A next generation eNB (NG-eNB) configures the PUR for the UE by including a PUR-Config field in an RRC connection release (RRCConnectionRelease) message, and simultaneously releases the UE to the IDLE state. The configuration of the PUR is determined by the NG-eNB, possibly based on the UE request, UE registration information and/or a local policy.

It should be noted that the PUR is only valid within a cell for current configuration, that is, when the UE detects that the cell changes and initiates random access in a new cell, the UE needs to release the PUR configured in the original cell.

For a user plane function optimization solution of an evolved packet system (EPS)/5G system (5GS) cellular Internet of Things, the UE in the IDLE state needs to meet the following preconditions before using the PUR for data transmission:

1. Valid timing advance (TA).

The following two conditions need to be met at the same time:

a) TA timer: a media access control (MAC) layer starts the TA timer after receiving an instruction from a higher layer. When determining validity of TA, the higher layer can confirm with the MAC layer whether the TA timer is running. When the TA timer times out, the MAC layer needs to give a feedback to the higher layer.
b) Reference signal received power (RSRP) change: if the RSRP change (increase or decrease) is greater than a set threshold, the TA is considered to be invalid.

2. NCC.

Be included in the RRC connection release (RRCConnectionRelease) message for derivation of a new key.

3. Valid PUR.
4. There are RRC connection establishment or resume requirements, such as uplink data arrival.

In order to better understand the embodiments of the present application, RRC connection establishment resume related to the present application will be described.

In the RRC connection establishment resume, a terminal device starts a timer T319after transmitting an RRC resume request (RRCResumeRequest), and stops the timer T319 after receiving an RRC resume (RRCResume). If the connection establishment resume is not completed within a certain time, that is, when the timer T319 times out, the timer T319 controls the UE to enter an idle state, and connection establishment resume failure information is recorded.

In a 5G NR system, RRC states are divided into three types, namely, an RRC idle state (RRC_IDLE), an RRC inactive state (RRC_INACTIVE) and an RRC connected state (RRC_CONNECTED). The RRC_INACTIVE state is a new state introduced by the 5G system from a perspective of energy saving. For a UE in the RRC_INACTIVE state, a radio bearer and all radio resources will be released, but the UE side and a base station side retain a UE access context so as to quickly resume an RRC connection. The network usually keeps the UE with infrequent data transmission in the RRC_INACTIVE state. Before the release 16 (Rel-16), a UE in the RRC_INACTIVE state does not support data transmission. When data arrives, the UE needs to resume the connection, and is then released to the INACTIVE state after the data transmission is completed. For a UE with small data amount and low transmission frequency, such a transmission mechanism will lead to unnecessary power consumption and signaling overhead. Therefore, release 17 (Rel-17) sets up a project to carry out research on small data transmission under RRC_INACTIVE, and a project goal is mainly in two directions: uplink small data transmission based on a random access process (two-step/four-step) and uplink small data transmission based on a configured grant (CG) resource (such as CG type 1).

In addition, in the NR system, multiple times of UL/DL data transmission are supported in the same small data transmission (SDT) process, and the RRC state of the UE does not change. In this case, how to realize SDT of a terminal device in the inactive state is an urgent problem to be solved.

Based on the above problems, the present application proposes a data transmission solution, which can realize continuous inactive-state small data transmission.

The technical solutions of the present application will be described in detail through specific embodiments.

Figure 4:
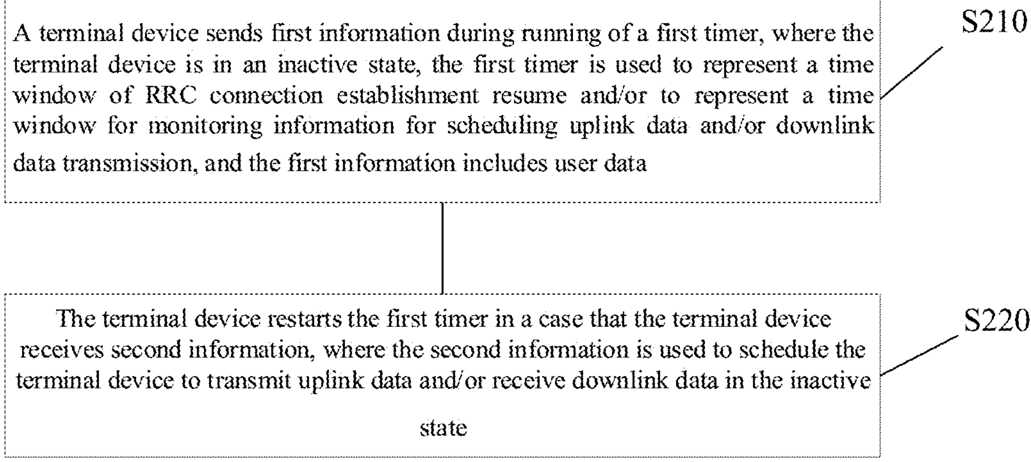
FIG. 4 is a schematic flowchart of a data transmission method provided by an embodiment of the present application.

FIG. 4 is a schematic flowchart of a data transmission method 200 according to an embodiment of the present application. As shown in FIG. 4, the method 200 can include at least part of the following contents.

S210, a terminal device sends first information during running of a first timer, where the terminal device is in an inactive state, the first timer is used to represent a time window of RRC connection establishment resume and/or a time window for monitoring information for scheduling uplink data and/or downlink data transmission, and the first information includes user data.

S220, the terminal device restarts the first timer in a case that the terminal device receives second information, where the second information is used to schedule the terminal device to transmit uplink data and/or receive downlink data in the inactive state.

In the embodiment of the present application, the user data included in the first information may be data in the SDT process described above. That is, the terminal device performs small data transmission during running of the first timer.

It should be noted that the timer used to represent the time window of the RRC connection establishment resume may be a timer T319.

In an implementation, the first information further includes indication information for indicating whether further transmission of uplink data and/or downlink data is expected. For example, the indication information may be a buffer status report (BSR).

In addition, the first information may further include an RRC resume request (RRCResumeRequest).

In an implementation, in some embodiments, the terminal device stops the first timer in a case that the terminal device receives third information, where the third information includes at least one of the following:

RRC release information (RRCRelease), RRC resume information (RRCResume), RRC setup information (RRCSetup), RRC reject information (RRCReject).

In an implementation, in the embodiment of the present application, the terminal device may start the first timer when a condition for triggering the SDT is met and in a process of triggering the SDT.

The data transmission in the embodiment of the present application may be small data transmission in four-step random access, may also be small data transmission in two-step random access, and may also be small data transmission based on a CG resource.

The solutions of restarting the first timer by the terminal device are described in detail through Examples 1 to 7.

Example 1, in a case that the first information is carried in a message3 (Msg 3) in four-step random access, the terminal device receives a message4 (Msg 4) in the four-step random access, where the Msg 4 in the four-step random access does not carry RRC information; and the terminal device restarts the first timer.

It should be noted that in Example 1, the RRC information includes at least one of the following:

RRC release information (RRCRelease), RRC resume information (RRCResume), RRC setup information (RRC-Setup), RRC reject information (RRCReject).

In an implementation, in Example 1, a restarting time of the first timer is a time when the terminal device receives the Msg 4 in the four-step random access.

Example 2, the first information is carried in a Msg 3 in four-step random access, and the second information is carried in a Msg 4 in the four-step random access.

In an implementation, in Example 2, a restarting time of the first timer is at least one of the following:

a time when the terminal device receives the Msg 4 in the four-step random access;

a time when the terminal device completes data transmission according to the second information.

Example 3, the first information is carried in a Msg 3 in four-step random access, and the second information is information received by the terminal device after receiving a Msg 4 in the four-step random access.

In an implementation, in Example 3, a restarting time of the first timer is at least one of the following:

a time when the terminal device receives the second information;

a time when the terminal device completes data transmission according to the second information.

In an implementation, in Example 3, the second information is a physical downlink control channel (PDCCH) scrambled by a cell radio network temporary identity (C-RNTI).

Example 4: in a case that the first information is carried in a messageA (Msg A) in two-step random access, the terminal device receives a messageB (Msg B) in the two-step random access, where the Msg B in the two-step random access does not carry RRC information; and the terminal device restarts the first timer.

It should be noted that in Example 4, the RRC information includes at least one of the following:

RRC release information (RRCRelease), RRC resume information (RRCResume), RRC setup information (RRC-Setup), RRC reject information (RRCReject).

In an implementation, in Example 4, a restarting time of the first timer is a time when the terminal device receives the Msg B in the two-step random access.

Example 5, the first information is carried in a Msg A in two-step random access, and the second information is carried in a Msg B in the two-step random access.

In an implementation, in Example 5, a restarting time of the first timer is at least one of the following:

a time when the terminal device receives the Msg B in the two-step random access;

a time when the terminal device completes data transmission according to the second information.

Example 6, the first information is carried in a Msg A in two-step random access, and the second information is information received by the terminal device after receiving a Msg B in the two-step random access.

In an implementation, in Example 6, a restarting time of the first timer is at least one of the following:

a time when the terminal device receives the second information;

a time when the terminal device completes data transmission according to the second information.

In an implementation, in Example 6, the second information is a PDCCH scrambled by a C-RNTI.

Example 7, the first information is transmitted by the terminal device through a CG resource.

In an implementation, in Example 7, the second information is a PDCCH scrambled by a C-RNTI.

Therefore, in the embodiment of the present application, after inactive-state small data transmission of the first time, if the terminal device receives scheduling from a network device to schedule the terminal device to transmit uplink data and/or receive downlink data in the inactive state, the terminal device restarts the first timer. That is, the first timer will not restrict the inactive-state small data transmission, so that continuous inactive-state small data transmission can be realized.

The solution of the data transmission method 200 of the present application will be described in detail through the following Embodiments 1 to 3.

Embodiment 1: data transmission is small data transmission in four-step random access, and the first timer takes T319 as an example. a specific process of data transmission can be as described in S21-S28.

S21, a terminal device meets a condition for triggering SDT, triggers an SDT process, and starts T319.

S22, the terminal device selects a random access preamble and a physical random access channel (PRACH) resource used for preamble transmission from SDT dedicated preamble resources, and sends the preamble to a network device, that is, the terminal device sends Msg 1 to the network device.

S23, the terminal device receives a random access response (RAR) sent by the network device, that is, the terminal device receives Msg2 sent by the network device.

The RAR includes at least: a timing advanced command, uplink grant, a temporary cell radio network temporary identity (TC-RNTI).

S24, the terminal device sends Msg3 to the network device by using the UL grant in the RAR.

The Msg 3 includes at least:

an RRC resume request (RRCResumeRequest), user data (i.e., small data), information indicating whether further uplink data transmission and/or downlink data reception is expected (e.g., a BSR).

Figure 5:
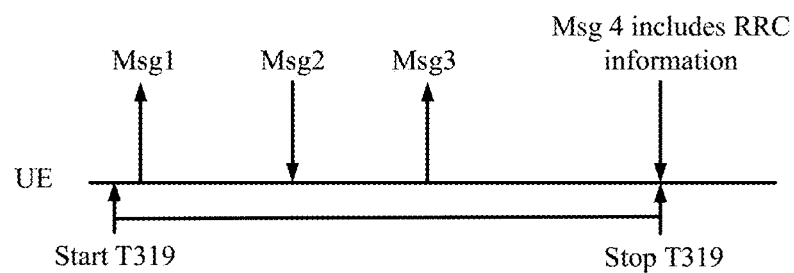
FIG. 5 is a schematic diagram of starting and stopping a first timer provided by an embodiment of the present application.

S25, if the terminal device receives Msg 4 sent by the network device, where Msg 4 is scheduled by a PDCCH scrambled by a TC-RNTI and Msg 4 includes a contention collision resolution identifier and RRC information, and the RRC information is one of RRCRelease/RRCResume/RRC-Setup/RRCReject, then the terminal device ends the SDT and stops T319. A specific schematic diagram of starting and stopping T319 is as shown in FIG. 5.

S26, if the terminal device receives Msg 4 sent by the network device, where Msg 4 is scheduled by the PDCCH scrambled by the TC-RNTI and Msg 4 includes the contention collision resolution identifier but does not include RRC information, and in an implementation, Msg 4 includes UL grant A for new uplink transmission, then the terminal device remains in the RRC inactive state and restarts T319.

A restarting time of T319 has the following three options:

1. a time when the terminal device receives Msg 4; 2. the time when the terminal device receives Msg 4, and Msg 4 includes UL grant A for new uplink transmission; 3. a time when the terminal device completes uplink transmission by using UL grant A.

S27, if the terminal device receives, after Msg 4, uplink and/or downlink transmission scheduled by the network device through the PDCCH scrambled by the C-RNTI, then the terminal device remains in the RRC inactive state and restarts T319.

The restarting time of T319 includes at least one of the following:

a time when the terminal device receives the PDCCH scrambled by the C-RNTI;

a time when the terminal device completes data transmission according to the PDCCH scrambled by the C-RNTI.

S28, when the terminal device receives one kind of RRC information in RRCRelease/RRCResume/RRCSetup/RR-CReject sent by the network device, the terminal device stops T319.

Figure 6:
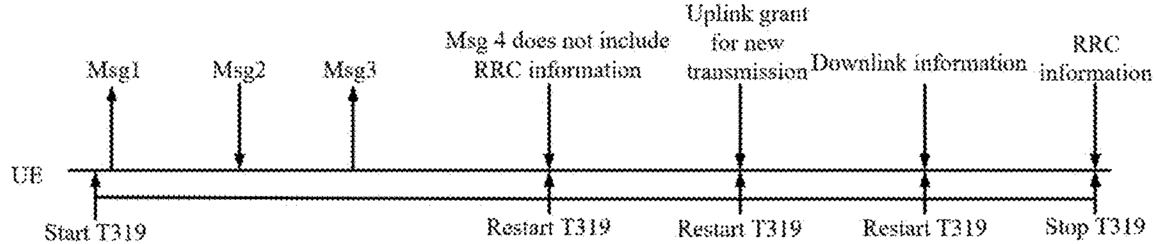
FIG. 6 is a schematic diagram of starting, restarting and stopping a first timer provided by an embodiment of the present application.

A specific schematic diagram of starting and stopping T319 in S26-S28 is as shown in FIG. 6.

It should be noted that in Embodiment 1, the terminal device may execute S21-S25 to realize data transmission; the terminal may also execute S21-S24, S26 and S28 to realize data transmission; and the terminal may also execute S21-S24, S26-S28 to realize data transmission.

Embodiment 2, data transmission is small data transmission in two-step random access, and the first timer takes T319 as an example. A specific process of data transmission can be as described in S31-S38.

S31, a terminal device meets a condition for triggering SDT, triggers an SDT process, and starts T319.

S32, the terminal device selects a random access preamble and a PRACH resource used for preamble transmission from SDT dedicated preamble resources, determines a physical uplink shared channel (PUSCH) resource corresponding to the selected preamble, and sends the preamble to a network device, that is, the terminal device sends Msg A to the network device.

Msg A payload includes at least:

an RRC resume request (RRCResumeRequest), user data (i.e., small data), information indicating whether further uplink data transmission and/or downlink data reception is expected (e.g., a BSR).

Figure 7:
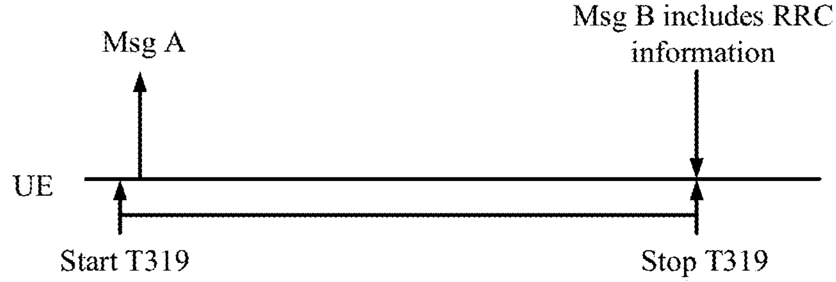
FIG. 7 is another schematic diagram of starting and stopping a first timer provided by an embodiment of the present application.

S33, the terminal device receives Msg B including a success RAR (successRAR) and RRC information sent by the network device, where the RRC information is one of RRCRelease/RRCResume/RRCSetup/RRCReject, and the terminal device ends the SDT and stops T319. A specific schematic diagram of starting and stopping T319 is as shown in FIG. 7.

S34, the terminal device receives Msg B including the successRAR sent by the network device, where the Msg B does not include RRC information, and in an implementation, Msg B includes UL grant B for new uplink transmission, then the terminal device remains in the RRC inactive state and restarts T319.

A restarting time of T319 has the following three options:

1. a time when the terminal device receives Msg B; 2. the time when the terminal device receives Msg B, and Msg B includes UL grant B for new uplink transmission; 3. a time when the terminal device completes uplink transmission by using UL grant B.

S35, if the terminal device receives, after Msg B, uplink and/or downlink transmission scheduled by the network device through the PDCCH scrambled by the C-RNTI, then the terminal device remains in the RRC inactive state and restarts T319.

The restarting time of T319 includes at least one of the following:

a time when the terminal device receives the PDCCH scrambled by the C-RNTI;

a time when the terminal device completes data transmission according to the PDCCH scrambled by the C-RNTI.

S36, when the terminal device receives one kind of RRC information in RRCRelease/RRCResume/RRCSetup/RRCReject sent by the network device, the terminal device stops T319.

Figure 8:
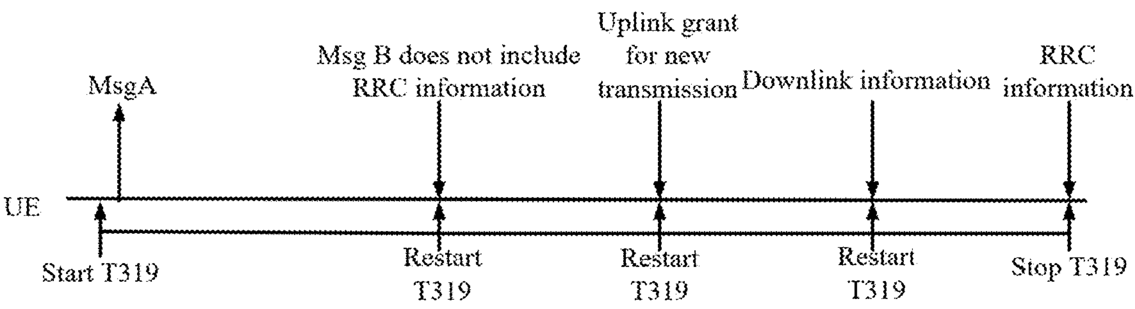
FIG. 8 is another schematic diagram of starting, restarting and stopping a first timer provided by an embodiment of the present application.

A specific schematic diagram of starting and stopping T319 in S34-S36 is as shown in FIG. 8.

It should be noted that in Embodiment 2, the terminal device may execute S31-S33 to realize data transmission; the terminal may also execute S31-S32, S34 and S36 to realize data transmission; and the terminal may also execute S31-S32, S34-S36 to realize data transmission.

Embodiment 3, data transmission is small data transmission based on a CG resource, and the first timer takes T319 as an example. A specific process of data transmission can be as described in S41-S45.

S41, a terminal device meets a condition for triggering SDT, triggers an SDT process, and starts T319.

S42, the terminal device performs uplink transmission using a CG resource, and the uplink transmission includes at least:

an RRC resume request (RRCResumeRequest), user data (i.e., small data), information indicating whether further uplink data transmission and/or downlink data reception is expected (e.g., a BSR).

S43, the terminal device receives RRC information sent by a network device, and the terminal device ends the SDT and stops T319.

The RRC information is one of RRCRelease/RRCResume/RRCSetup/RRCReject, and a specific schematic diagram of starting and stopping T319 is as shown in FIG. 9.

S44, if the terminal device receives an uplink and/or a downlink scheduled by the network device through a PDCCH scrambled by a C-RNTI after uplink transmission of the first time, the terminal device remains in the RRC inactive state and restarts T319.

A restarting time of T319 includes at least one of the following:

a time when the terminal device receives the PDCCH scrambled by C-RNTI;

a time when the terminal device completes data transmission according to the PDCCH scrambled by the C-RNTI.

S45, when the terminal device receives one kind of RRC information from RRCRelease/RRCResume/RRCSetup/RRCReject sent by the network device, the terminal device stops T319.

A specific schematic diagram of starting and stopping T319 in S44-S45 is as shown in FIG. 10.

It should be noted that in Embodiment 3, the terminal device may perform S41-S43 to realize data transmission; and the terminal may also perform S41-S42, S44 and S45 to realize data transmission.

FIG. 11 is a schematic flowchart of a data transmission method 300 according to an embodiment of the present application. As shown in FIG. 11, the method 300 can include at least part of the following contents.

S310, a terminal device sends first information during running of a first timer, where the terminal device is in an inactive state, the first timer is used to represent a time window of RRC connection establishment resume, and the first information includes user data.

S320, the terminal device starts or restarts a second timer in a case that the terminal device receives second information after the first information, where the second information is used to schedule the terminal device to transmit uplink data and/or receive downlink data in the inactive state, and the second timer is used to represent a time window for the terminal device to monitor information for scheduling uplink data and/or downlink data transmission and/or to represent a time window of RRC connection establishment resume.

In the embodiment of the present application, the user data included in the first information may be data in the SDT process described above. That is, the terminal device performs small data transmission during running of the first timer.

It should be noted that the timer used to represent the time window of the RRC connection establishment resume may be a timer T319. That is, the first timer may be the timer T319.

In an implementation, the first information further includes indication information for indicating whether further transmission of uplink data and/or downlink data is expected. For example, the indication information may be a BSR.

In addition, the first information may further include an RRC resume request (RRCResumeRequest).

In an implementation, in some embodiments, the terminal device stops the first timer in a case that the terminal device starts or restarts the second timer.

In an implementation, in some embodiments, the terminal device stops the first timer and/or the second timer in a case that the terminal device receives third information, where the third information includes at least one of the following:

RRC release information (RRCRelease), RRC resume information (RRCResume), RRC setup information (RRCSetup), RRC reject information (RRCReject).

In an implementation, in the embodiment of the present application, the terminal device may start the first timer when a condition for triggering the SDT is met and in a process of triggering the SDT.

In the embodiment of the present application, if the second timer times out but the first timer runs, the terminal device executes a function corresponding to a running state of the first timer; if the first timer times out but the second timer runs, the terminal device performs a function corresponding to a running state of the second timer, that is, one of the first timer and the second timer that does not stop running shall prevail.

The data transmission in the embodiment of the present application may be small data transmission in four-step random access, small data transmission in two-step random access, and small data transmission based on a CG resource.

The solutions of restarting the first timer by the terminal device are described in detail through Examples 1 to 7.

Example 1, in a case that the first information is carried in a Msg 3 in four-step random access, the terminal device receives a Msg 4 in the four-step random access, where the Msg 4 in the four-step random access does not carry RRC information; and the terminal device starts or restarts the first timer.

It should be noted that in Example 1, the RRC information includes at least one of the following:

RRC release information (RRCRelease), RRC resume information (RRCResume), RRC setup information (RRC-Setup), RRC reject information (RRCReject).

In an implementation, in Example 1, a starting or restarting time of the second timer includes at least one of the following:

- a time when the terminal device receives the Msg 4 in the four-step random access;
- a time when the terminal device sends the Msg 3 in the four-step random access.

Example 2, the first information is carried in a Msg 3 in four-step random access, and the second information is carried in a Msg 4 in the four-step random access.

In an implementation, in Example 2, a starting or restarting time of the second timer includes at least one of the following:

- a time when the terminal device receives the Msg 4 in the four-step random access;
- a time when the terminal device completes data transmission according to the second information.

Example 3, the first information is carried in a Msg 3 in four-step random access, and the second information is information received by the terminal device after receiving a Msg 4 in the four-step random access.

In an implementation, in Example 3, a starting or restarting time of the second timer includes at least one of the following:

- a time when the terminal device receives the second information;
- a time when the terminal device completes data transmission according to the second information.

In an implementation, in Example 3, the second information is a PDCCH scrambled by a C-RNTI.

Example 4, in a case that the first information is carried in a Msg A in two-step random access, the terminal device receives a Msg B in the two-step random access, where the Msg B in the two-step random access does not carry RRC information; and the terminal device starts or restarts the second timer.

It should be noted that in Example 4, the RRC information includes at least one of the following:

- RRC release information (RRCRelease), RRC resume information (RRCResume), RRC setup information (RRCSetup), RRC reject (RRCReject) information.

In an implementation, in Example 4, a starting or restarting time of the second timer is a time when the terminal device receives the Msg B in the two-step random access.

Example 5, the first information is carried in a Msg A in two-step random access, and the second information is carried in a Msg B in the two-step random access.

In an implementation, in Example 5, a starting or restarting time of the second timer includes at least one of the following:

- a time when the terminal device receives the Msg B in the two-step random access;
- a time when the terminal device completes data transmission according to the second information.

Example 6, the first information is carried in a Msg A in two-step random access, and the second information is information received by the terminal device after receiving a Msg B in the two-step random access.

In an implementation, in Example 6, the second information is a PDCCH scrambled by a C-RNTI.

In an implementation, in Example 6, a starting or restarting time of the second timer includes at least one of the following:

- a time when the terminal device receives the second information;
- a time when the terminal device completes data transmission according to the second information.

Example 7, the first information is transmitted by the terminal device through a CG resource.

In an implementation, in Example 7, the second information is a PDCCH scrambled by a C-RNTI.

Therefore, in the embodiment of the present application, after inactive-state small data transmission of the first time, if the terminal device receives scheduling from a network device to schedule the terminal device to transmit uplink data and/or receive downlink data in the inactive state, the terminal device starts or restarts the second timer. That is, by introducing the second timer, continuous inactive-state small data transmission can be realized.

The solution of the data transmission method 300 of the present application will be described in detail below through the following Embodiment 4. Of course, the solution of the data transmission method 300 of the present application may also be implemented in a similar way to Embodiment 2 and Embodiment 3, the specific processes of which will not be repeated here.

Embodiment 4, data transmission is small data transmission in four-step random access, and a specific process of data transmission can be as described in S51-S58.

S51, a terminal device meets a condition for triggering SDT, triggers an SDT process, and starts a first timer.

S52, the terminal device selects a random access preamble and a PRACH resource used for preamble transmission from SDT dedicated preamble resources, and sends the preamble to a network device, that is, the terminal device sends Msg 1 to the network device.

S53, the terminal device receives a RAR sent by the network device, that is, the terminal device receives Msg2 sent by the network device.

The RAR includes at least: a timing advanced command, uplink grant (UL grant), a TC-RNTI.

S54, the terminal device sends Msg3 to the network device by using the UL grant in the RAR.

Msg 3 includes at least:

- an RRC resume request (RRCResumeRequest), user data (i.e., small data), information indicating whether further uplink data transmission and/or downlink data reception is expected (e.g., a BSR).

S55, if the terminal device receives Msg 4 sent by the network device, where Msg 4 is scheduled by a PDCCH scrambled by a TC-RNTI and Msg 4 includes a contention collision resolution identifier and RRC information, and the RRC information is one of RRCRelease/RRCResume/RRC-Setup/RRCReject, then the terminal device ends the SDT and stops the first timer. A specific schematic diagram of starting and stopping the first timer is as shown in FIG. 5.

S56, if the terminal device receives Msg 4 sent by the network device, where Msg 4 is scheduled by a PDCCH scrambled by a TC-RNTI and Msg 4 includes a contention collision resolution identifier but does not include RRC information, and in an implementation, Msg 4 includes UL grant C for new uplink transmission, then the terminal device remains in the RRC inactive state and starts a second timer.

A starting time of the second timer has the following three options:

1. a time when the terminal device receives Msg 4; 2. the time when the terminal device receives Msg 4, and Msg 4 includes UL grant C for new uplink transmission; 3. a time when the terminal device completes uplink transmission by using UL grant C.

S57, if the terminal device receives, after Msg 4, an uplink and/or a downlink scheduled by the network device through the PDCCH scrambled by the C-RNTI, the terminal device remains in the RRC inactive state and starts or restarts the second timer.

A starting or restarting time of the second timer includes at least one of the following:

a time when the terminal device receives the PDCCH scrambled by the C-RNTI;

a time when the terminal device completes data transmission according to the PDCCH scrambled by the C-RNTI.

S58, when the terminal device receives one kind of RRC information in RRCRelease/RRCResume/RRCSetup/RR-CReject sent by the network device, the terminal device stops the first timer and/or the second timer.

A specific schematic diagram of starting and stopping the first timer and the second timer in S56-S58 is as shown in FIG. 12 or FIG. 13.

It should be noted that in Embodiment 4, if the second timer times out but the first timer runs, the terminal device executes a function corresponding to the running state of the first timer; if the first timer times out but the second timer runs, the terminal device performs a function corresponding to the running state of the second timer, that is, one of the first timer and the second timer that does not stop running shall prevail.

In addition, in Embodiment 4, during running of the first timer, the terminal device monitors downlink data reception scheduled by the network device through the PDCCH scrambled by C-RNTI/TC-RNTI/MsgB-RNTI; and during running of the second timer, the terminal device monitors uplink data transmission and downlink data reception scheduled by the network device through the PDCCH scrambled by the C-RNTI.

In Embodiment 4, the terminal device may execute S51-S55 to realize data transmission; the terminal may also execute S51-S54, S56 and S58 to realize data transmission; and the terminal may also execute S51-S54, S56-S58 to realize data transmission.

FIG. 14 is a schematic flowchart of a data transmission method 400 according to an embodiment of the present application. As shown in FIG. 14, the method 400 can include at least part of the following contents.

S410, a terminal device sends first information during running of a first timer, where the terminal device is in an inactive state, the first information includes user data, and the first timer is used to represent a time window of RRC connection establishment resume and/or to represent a time window for the terminal device to monitor information for scheduling uplink data and/or downlink data transmission.

In the embodiment of the present application, the user data included in the first information may be data in the SDT process described above. That is, the terminal device performs small data transmission during running of the first timer.

It should be noted that the timer used to represent the time window of the RRC connection establishment resume may be a timer T319.

In an implementation, the first information further includes indication information for indicating whether further transmission of uplink data and/or downlink data is expected. For example, the indication information may be a buffer status report (BSR).

In addition, the first information may further include an RRC resume request (RRCResumeRequest).

In an implementation, in some embodiments, the terminal device stops the first timer in a case that the terminal device receives second information, where the second information includes at least one of the following:

RRC release information, RRC resume information, RRC setup information, RRC reject information.

In an implementation, in the embodiment of the present application, a duration of the first timer is longer than a duration of the timer T319.

In an implementation, in some embodiments, the first information is carried in a Msg 3 in four-step random access, or the first information is carried in a Msg A in two-step random access.

In an implementation, in some embodiments, the first information is transmitted by the terminal device through a CG resource.

In the embodiment of the present application, the first timer may be a new timer, such as T319bis, which has a same function as T319 but whose time length is longer than T319. When the SDT is triggered, the terminal device starts T319bis, and no operation is required to be performed on the timer T319bis during the entire SDT process. The purpose is to prevent the SDT process from terminating in advance due to timeout of T319.

Therefore, in the embodiment of the present application, by redefining a function of the first timer, the first timer will not restrict inactive-state small data transmission, so that continuous inactive-state small data transmission can be realized.

Method embodiments of the present application are described in detail with reference to FIG. 4 to FIG. 14 above, and apparatus embodiments of the present application are described in detail with reference to FIG. 15 to FIG. 20 below. It should be understood that the apparatus embodiments and the method embodiments correspond to each other, and similar descriptions can be found in the method embodiments.

Figure 15:
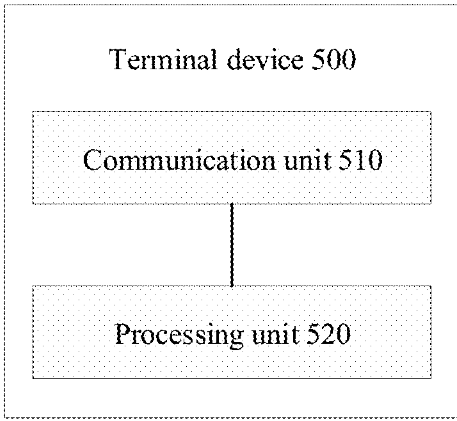
FIG. 15 is a schematic block diagram of a terminal device provided by an embodiment of the present application.

FIG. 15 is a schematic block diagram of a terminal device 500 according to an embodiment of the present application. As shown in FIG. 15, the terminal device 500 includes:

a communication unit 510, configured to send first information during running of a first timer, where the terminal device is in an inactive state, the first timer is used to represent a time window of radio resource control RRC connection establishment resume and/or to represent a time window for monitoring information for scheduling uplink data and/or downlink data transmission, and the first information includes user data;

a processing unit 520, configured to restart the first timer in a case that the terminal device receives second information, where the second information is used to schedule the terminal device to transmit uplink data and/or receive downlink data in the inactive state.

In an implementation, the processing unit is further configured to stop the first timer in a case that the terminal device receives third information, where the third information includes at least one of the following:

RRC release information, RRC resume information, RRC setup information, RRC reject information.

In an implementation, in a case that the first information is carried in a Msg 3 in four-step random access, the communication unit 510 is further configured to receive a Msg 4 in the four-step random access, where the Msg 4 in the four-step random access does not carry RRC information;

the processing unit 520 is further configured to restart the first timer.

In an implementation, a restarting time of the first timer is a time when the terminal device receives the Msg 4 in the four-step random access.

In an implementation, the first information is carried in a Msg 3 in four-step random access, and the second information is carried in a Msg 4 in the four-step random access.

In an implementation, a restarting time of the first timer is at least one of the following:

a time when the terminal device receives the Msg 4 in the four-step random access;

a time when the terminal device completes data transmission according to the second information.

In an implementation, the first information is carried in a Msg 3 in four-step random access, and the second information is information received by the terminal device after receiving a Msg 4 in the four-step random access.

In an implementation, a restarting time of the first timer is at least one of the following:

a time when the terminal device receives the second information;

a time when the terminal device completes data transmission according to the second information.

In an implementation, in a case that the first information is carried in a Msg A in two-step random access, the communication unit 510 is further configured to receive a Msg B in the two-step random access, where the Msg B in the two-step random access does not carry RRC information;

the processing unit 520 is further configured to restart the first timer.

In an implementation, a restarting time of the first timer is a time when the terminal device receives the Msg B in the two-step random access.

In an implementation, the first information is carried in a Msg A in two-step random access, and the second information is carried in a Msg B in the two-step random access.

In an implementation, a restarting time of the first timer is at least one of the following:

a time when the terminal device receives the Msg B in the two-step random access;

a time when the terminal device completes data transmission according to the second information.

In an implementation, the first information is carried in a Msg A in two-step random access, and the second information is information received by the terminal device after receiving a Msg B in the two-step random access.

In an implementation, a restarting time of the first timer is at least one of the following:

a time when the terminal device receives the second information;

a time when the terminal device completes data transmission according to the second information.

In an implementation, the first information is transmitted by the terminal device through a configured grant CG resource.

In an implementation, the second information is a physical downlink control channel PDCCH scrambled by a cell radio network temporary identity C-RNTI.

In an implementation, the first information further includes indication information for indicating whether further transmission of uplink data and/or downlink data is expected.

In an implementation, in some embodiments, the communication unit may be a communication interface or a transceiver, or an input/output interface of a communication chip or a system on chip. The processing unit may be one or more processors.

It should be understood that the terminal device 500 according to the embodiment of the present application may correspond to the terminal device in the method embodiments of the present application, and the above and other operations and/or functions of the units in the terminal device 500 are respectively to implement the corresponding processes of the terminal device in the method 200 shown in FIG. 4, which will not be repeated here for brevity.

Figure 16:
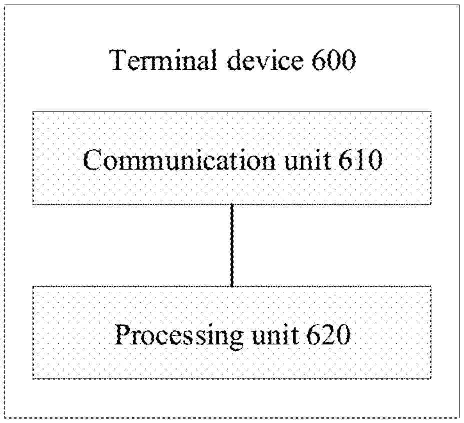
FIG. 16 is a schematic block diagram of another terminal device provided by an embodiment of the present application.

FIG. 16 is a schematic block diagram of a terminal device 600 according to an embodiment of the present application. As shown in FIG. 16, the terminal device 600 includes:

a communication unit 610, configured to send first information during running of a first timer, where the terminal device is in an inactive state, the first timer is used to represent a time window of radio resource control RRC connection establishment or RRC connection establishment resume, and the first information includes user data;

a processing unit 620, configured to start or restart a second timer in a case that the terminal device receives second information after the first information, where the second information is used to schedule the terminal device to transmit uplink data and/or receive downlink data in the inactive state, and the second timer is used to represent a time window for the terminal device to monitor information for scheduling uplink data and/or downlink data transmission and/or to represent a time window of RRC connection establishment resume.

In an implementation, the processing unit is further configured to stop the first timer in a case that the terminal device starts or restarts the second timer.

In an implementation, the processing unit is further configured to stop the first timer and/or the second timer in a case that the terminal device receives third information, where the third information includes at least one of the following:

RRC release information, RRC resume information, RRC setup information, RRC reject information.

In an implementation, in a case that the first information is carried in a Msg 3 in four-step random access, the communication unit is further configured to receive a Msg 4 in the four-step random access, where the Msg 4 in the four-step random access does not carry RRC information;

the processing unit is further configured to start or restart the second timer.

In an implementation, a starting or restarting time of the second timer includes at least one of the following:

a time when the terminal device receives the Msg 4 in the four-step random access;

a time when the terminal device sends the Msg 3 in the four-step random access.

In an implementation, the first information is carried in a Msg 3 in four-step random access, and the second information is carried in a Msg 4 in the four-step random access.

In an implementation, a starting or restarting time of the second timer includes at least one of the following:

a time when the terminal device receives the Msg 4 in the four-step random access;

a time when the terminal device completes data transmission according to the second information.

In an implementation, the first information is carried in a Msg 3 in four-step random access, and the second information is information received by the terminal device after receiving a Msg 4 in the four-step random access.

In an implementation, a starting or restarting time of the second timer includes at least one of the following:

a time when the terminal device receives the second information;

a time when the terminal device completes data transmission according to the second information.

In an implementation, in a case that the first information is carried in a Msg A in two-step random access, a communication unit is further configured to receive a Msg B in the two-step random access, where the Msg B in the two-step random access does not carry RRC information;

a processing unit is further configured to start or restart the second timer.

In an implementation, a starting or restarting time of the second timer is a time when the terminal device receives the Msg B in the two-step random access.

In an implementation, the first information is carried in a Msg A in two-step random access, and the second information is carried in a Msg B in the two-step random access.

In an implementation, a starting or restarting time of the second timer includes at least one of the following:

a time when the terminal device receives the Msg B in the two-step random access;

a time when the terminal device completes data transmission according to the second information.

In an implementation, the first information is carried in a Msg A in two-step random access, and the second information is information received by the terminal device after receiving a Msg B in the two-step random access.

In an implementation, a starting or restarting time of the second timer includes at least one of the following:

a time when the terminal device receives the second information;

a time when the terminal device completes data transmission according to the second information.

In an implementation, the first information is transmitted by the terminal device through a configured grant CG resource.

In an implementation, the second information is a physical downlink control channel PDCCH scrambled by a cell radio network temporary identity C-RNTI.

In an implementation, the first information further includes indication information for indicating whether further transmission of uplink data and/or downlink data is expected.

In an implementation, in some embodiments, the communication unit may be a communication interface or a transceiver, or an input/output interface of a communication chip or a system on chip. The processing unit may be one or more processors.

It should be understood that the terminal device 600 according to the embodiment of the present application may correspond to the terminal device in the method embodiments of the present application, and the above and other operations and/or functions of the units in the terminal device 600 are respectively to implement the corresponding processes of the terminal device in the method 300 shown in FIG. 11, which will not be repeated here for brevity.

Figure 17:
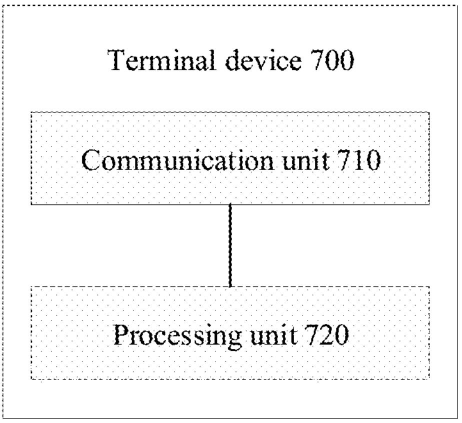
FIG. 17 is a schematic block diagram of still another terminal device provided by an embodiment of the present application.

FIG. 17 is a schematic block diagram of a terminal device 700 according to an embodiment of the present application. As shown in FIG. 17, the terminal device 700 includes:

a communication unit 710, configured to send first information during running of a first timer, where the terminal device is in an inactive state, the first information includes user data, and the first timer is used to represent a time window of radio resource control RRC connection establishment resume and/or to represent a time window for the terminal device to monitor information for scheduling uplink data and/or downlink data transmission.

In an implementation, the terminal device 700 further includes a processing unit 720, where, the processing unit 720 is configured to stop the first timer in a case that the terminal device receives second information, where the second information includes at least one of the following:

RRC release information, RRC resume information, RRC setup information, RRC reject information.

In an implementation, a duration of the first timer is longer than a duration of a timer T319.

In an implementation, the first information is carried in a Msg 3 in four-step random access, or the first information is carried in a Msg A in two-step random access.

In an implementation, the first information is transmitted by the terminal device through a configured grant CG resource.

In an implementation, the first information further includes indication information for indicating whether further transmission of uplink data and/or downlink data is expected.

In an implementation, in some embodiments, the communication unit may be a communication interface or a transceiver, or an input/output interface of a communication chip or a system on chip. The processing unit may be one or more processors.

It should be understood that the terminal device 700 according to the embodiment of the present application may correspond to the terminal device in the method embodiments of the present application, and the above and other operations and/or functions of the units in the terminal device 700 are respectively to implement the corresponding processes of the terminal device in the method 400 shown in FIG. 14, which will not be repeated here for brevity.

Figure 18:
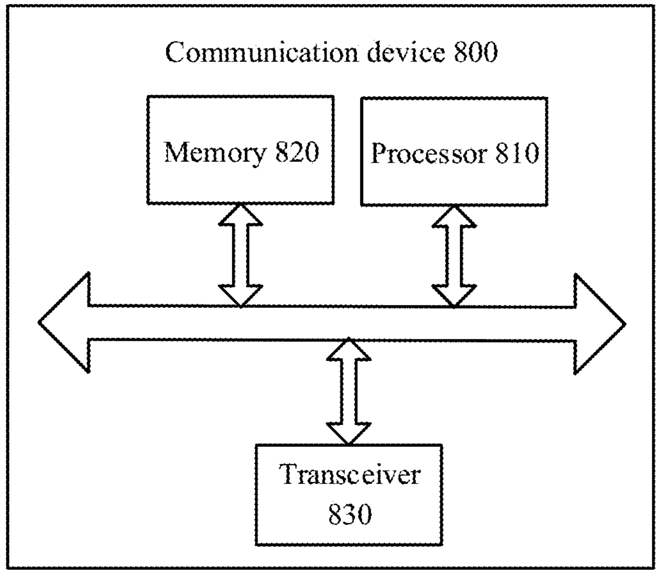
FIG. 18 is a schematic block diagram of a communication device provided by an embodiment of the present application.

FIG. 18 is a schematic structural diagram of a communication device 800 provided by an embodiment of the present application. The communication device 800 shown in FIG. 18 includes a processor 810, and the processor 810 can call and run a computer program from a memory to implement the method in the embodiments of the present application.

In an implementation, as shown in FIG. 18, the communication device 800 may further include a memory 820. The processor 810 can call and run a computer program from the memory 820 to implement the method in the embodiments of the present application.

The memory 820 may be a separate device independent of the processor 810 or integrated into the processor 810.

In an implementation, as shown in FIG. 18, the communication device 800 may further include a transceiver 830. The processor 810 can control the transceiver 830 to communicate with other devices, and specifically, can send information or data to other devices, or receive information or data from other devices.

The transceiver 830 may include a transmitter and a receiver. The transceiver 830 may further include antennas, and the number of antennas may be one or more.

In an implementation, the communication device 800 may specifically be the network device of the embodiments of the present application, and the communication device 800 can implement corresponding processes implemented by the network device in the methods of the embodiments of the present application, which will not be repeated here for brevity.

In an implementation, the communication device 800 may specifically be the mobile terminal/terminal device of the embodiments of the present application, and the communication device 800 can implement corresponding processes implemented by the mobile terminal/terminal device in the methods of the embodiments of the present application, which will not be repeated here for brevity.

Figure 19:
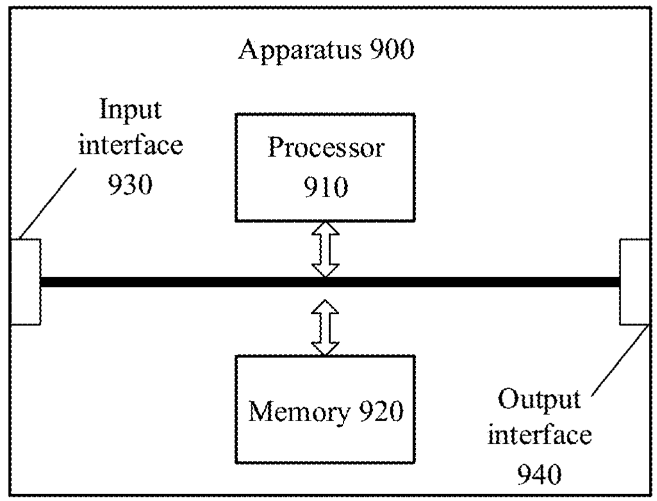
FIG. 19 is a schematic block diagram of an apparatus provided by an embodiment of the present application.

FIG. 19 is a schematic structural diagram of an apparatus of an embodiment of the present application. The apparatus 900 shown in FIG. 19 includes a processor 910, and the processor 910 can call and run a computer program from a memory to implement the method in the embodiments of the present application.

In an implementation, as shown in FIG. 19, the apparatus 900 may further include a memory 920. The processor 910 can call and run a computer program from the memory 920 to implement the method in the embodiments of the present application.

The memory 920 may be a separate device independent of the processor 910 or integrated into the processor 910.

In an implementation, the apparatus 900 may further include an input interface 930. The processor 910 can control the input interface 930 to communicate with other devices or chips, and specifically, can acquire information or data sent by other devices or chips.

In an implementation, the apparatus 900 may further include an output interface 940. The processor 910 can control the output interface 940 to communicate with other devices or chips, and specifically, can output information or data to other devices or chips.

In an implementation, the apparatus may be applied to the network device in the embodiments of the present application, and the apparatus can implement corresponding processes implemented by the network device in the methods of the embodiments of the present application, which will not be described here for brevity.

In an implementation, the apparatus may be applied to the mobile terminal/terminal device in the embodiments of the present application, and the apparatus can implement corresponding processes implemented by the mobile terminal/terminal device in the methods of the embodiments of the present application, which will not be repeated here for brevity.

In an implementation, the apparatus mentioned in the embodiments of the present application may also be a chip, for example, a system level chip, a system chip, a chip system or a system on chip, etc.

Figure 20:
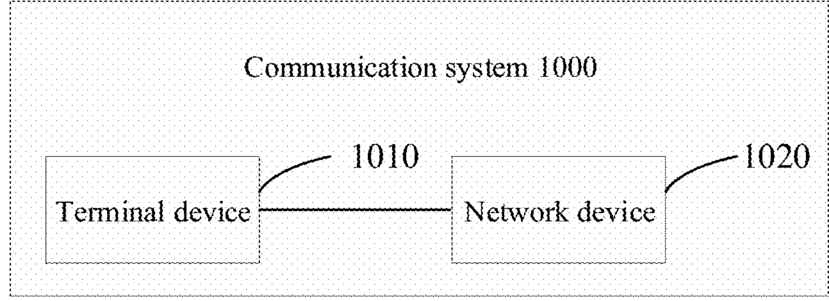
FIG. 20 is a schematic block diagram of a communication system provided by an embodiment of the present application.

FIG. 20 is a schematic block diagram of a communication system 1000 provided by an embodiment of the present application. As shown in FIG. 20, the communication system 1000 includes a terminal device 1010 and a network device 1020.

The terminal device 1010 can be configured to implement corresponding functions implemented by the terminal device in the above methods, and the network device 1020 can be configured to implement corresponding functions implemented by the network device in the above methods, which will not be repeated here for brevity.

It should be understood that the processor of the embodiments of the present application may be an integrated circuit chip with signal processing capability. In an implementation process, the steps of the above method embodiments may be completed by an integrated logic circuit of hardware in the processor or instructions in a form of software. The above processor may be a general-purpose processor, a digital signal processor (DSP), an application specific integrated circuit (ASIC), a field programmable gate array (FPGA) or other programmable logic devices, discrete gate or transistor logic devices, discrete hardware components, which can implement or execute methods, steps and logic diagrams disclosed in the embodiments of the present application. The general-purpose processor may be a microprocessor or the processor may be any conventional processor, etc. The steps of the methods disclosed in conjunction with the embodiments of the present application may be directly embodied in a completion of execution by a hardware decoding processor, or by a combination of hardware and software modules in the decoding processor. The software modules may be located in a mature storage medium in this field, such as a random access memory, a flash memory, a read-only memory, a programmable read-only memory, an electrically erasable programmable memory, or a register. The storage medium is located in a memory, and the processor reads information in the memory and completes the steps of the above methods in combination with its hardware.

It should be understood that the memory in the embodiments of the present application may be a volatile memory or a non-volatile memory, or may include both volatile and nonvolatile memories. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random access memory (RAM), which is used as an external cache. By way of illustration but not limitation, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM) and a direct rambus random access memory (Direct Rambus RAM, DR RAM). It should be noted that the memories of the systems and methods described herein are intended to include, but not limited to, these and any other suitable types of memories.

It should be understood that the above memories are illustrative but not restrictive description. For example, the memory in the embodiments of the present application may also be a static random access memory (static RAM, SRAM), a dynamic synchronous dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct rambus random access memory (Direct Rambus RAM, DR RAM), etc. That is, the memories in the embodiments of the present application are intended to include, but not limited to, these and any other suitable types of memories.

An embodiment of the present application further provides a computer-readable storage medium for storing a computer program.

In an implementation, the computer-readable storage medium may be applied to the network device in the embodiments of the present application, and the computer program causes a computer to execute corresponding processes implemented by the network device in the methods of the embodiments of the present application, which will not be repeated here for brevity.

In an implementation, the computer-readable storage medium may be applied to the mobile terminal/terminal device in the embodiments of the present application, and the computer program causes a computer to execute corresponding processes implemented by the mobile terminal/terminal device in the methods of the embodiments of the present application, which will not be repeated here for brevity.

An embodiment of the application further provides a computer program product including computer program instructions.

In an implementation, the computer program product may be applied to the network device in the embodiments of the present application, and the computer program instructions cause a computer to execute corresponding processes implemented by the network device in the methods of the embodiments of the present application, which will not be repeated here for brevity.

In an implementation, the computer program product may be applied to the mobile terminal/terminal device in the embodiments of the present application, and the computer program instructions cause a computer to execute corresponding processes implemented by the mobile terminal/terminal device in the methods of the embodiments of the present application, which will not be repeated here for brevity.

An embodiment of the present application further provides a computer program.

In an implementation, the computer program may be applied to the network device in the embodiments of the present application, and the computer program, when run on a computer, causes the computer to execute corresponding processes implemented by the network device in the methods of the embodiments of the present application, which will not be repeated here for brevity.

In an implementation, the computer program may be applied to the mobile terminal/terminal device in the embodiments of the present application, and the computer program, when run on a computer, causes the computer to execute corresponding processes implemented by the mobile terminal/terminal device in the methods of the embodiments of the present application, which will not be repeated here for brevity.

Those of ordinary skill in the art can realize that units and algorithm steps of the examples described in combination with the embodiments disclosed herein may be implemented by electronic hardware, or a combination of computer software and electronic hardware. Whether these functions are executed by hardware or software depends on the specific application and design constraints of the technical solution. Professional technical personnel may use different methods for each specific application to implement described functions, but such implementation should not be considered beyond the scope of the present application.

Those skilled in the art can clearly understand that, for convenience and conciseness of description, specific operation processes of the systems, apparatuses and units described above can be found in corresponding processes in the above method embodiments, which will not be repeated here.

In several embodiments provided in the present application, it should be understood that the disclosed systems, apparatuses and methods may be implemented in other ways. For example, the apparatus embodiments described above are only schematic. For example, a division of the units is only a logical function division, and there may be other ways of division in actual implementation. For example, multiple units or components may be combined or integrated into another system, or some features may be ignored or not executed. On another point, the shown or discussed mutual coupling or direct coupling or communication connection may be indirect coupling or communication connection through some interfaces, apparatuses or units, which may be in electrical, mechanical or other forms.

The units described as separate components may or may not be physically separated, and the components displayed as units may or may not be physical units, that is, they may be located in one place or distributed over multiple network units. Some or all of the units may be selected according to the actual needs to implement the purpose of the solutions of the embodiments.

In addition, the functional units in the embodiments of the present application may be integrated in one processing unit, or each unit may exist physically alone, or two or more units may be integrated in one unit.

If the functions are implemented in a form of software functional units and sold or used as an independent product, they can be stored in a computer-readable storage medium. For such understanding, the technical solution of the present application in essence, or the part that contributes to the prior art, or the part of the technical solution may be embodied in a form of a software product, and the computer software product is stored in a storage medium and includes several instructions to cause a computer device (which may be a personal computer, a server, or a network device, etc.) to execute all or part of the steps of the methods described in various embodiments of the present application. The aforementioned storage medium includes: a U disk, a mobile hard disk, a read-only memory (ROM), a random access memory (RAM), a magnetic disk, an optical disk or other media that can store program codes.

The above is only the specific implementations of the present application, but the protection scope of the present application is not limited thereto. Any person skilled in the art can easily think of modification or replacement within the technical scope disclosed in the present application, which should be covered within the protection scope of the present application. Therefore, the protection scope of the present application should be subject to the protection scope of the claims.

What is claimed is:

1. An inactive-state small data transmission method, comprising:

sending, by a terminal device, first information during running of a first timer, wherein the terminal device is in an inactive state, the first information comprises user data, the user data is data transmitted in a small data transmission (SDT) process, and the first timer is used to represent a time window of radio resource control (RRC) connection establishment resume and/or to represent a time window for the terminal device to monitor information for scheduling uplink small data and/or downlink small data transmission, wherein the first information further comprises an RRC resume request (RRCResumeRequest); and restarting, by the terminal device, the first timer in a case that the terminal device receives second information after the first information, wherein the second information is used to schedule the terminal device to transmit uplink data and/or receive downlink data in the inactive state, wherein the first information is transmitted by the terminal device through a configured grant (CG) resource;

wherein the first timer is used to represent the time window of RRC connection establishment resume, the method further comprises:

starting or restarting, by the terminal device, a second timer in a case that the terminal device receives the second information after the first information, wherein the second timer is used to represent a time window for the terminal device to monitor information for scheduling uplink data and/or downlink data transmission.

2. The method according to claim 1, wherein the method further comprises:

stopping, by the terminal device, the first timer in a case that the terminal device receives third information, wherein the third information comprises at least one of the following:

RRC release information, RRC resume information, RRC setup information, RRC reject information.

3. The method according to claim 1, wherein, a duration of the first timer is longer than a duration of a timer T319, and the first timer is different from the timer T319.

4. The method according to claim 3, further comprising:

when the SDT process is triggered, starting the first timer, wherein the first timer is used to achieve continuous inactive-state small data transmission.

5. The method according to claim 1, wherein the method further comprises:

stopping, by the terminal device, the first timer in a case that the terminal device starts or restarts the second timer.

6. The method according to claim 1, wherein the first information further comprises indication information for indicating whether further transmission of uplink small data and/or downlink small data is expected.

7. A terminal device, comprising: a processor and a memory, wherein the memory is configured to store a computer program, and the processor is configured to call and run the computer program stored in the memory to cause the terminal device to:

send first information during running of a first timer, wherein the terminal device is in an inactive state, the first information comprises user data, the user data is data transmitted in a small data transmission (SDT) process, and the first timer is used to represent a time window of radio resource control (RRC) connection establishment resume and/or to represent a time window for the terminal device to monitor information for scheduling uplink small data and/or downlink small data transmission, wherein the first information further comprises an RRC resume request (RRCResumeRequest); and restart the first timer in a case that the terminal device receives second information after the first information, wherein the second information is used to schedule the terminal device to transmit uplink data and/or receive downlink data in the inactive state, wherein the first information is transmitted by the terminal device through a configured grant (CG) resource;

wherein the first timer is used to represent the time window of RRC connection establishment resume, the terminal device is further caused to:

start or restart a second timer in a case that the terminal device receives the second information after the first information, wherein the second timer is used to represent a time window for the terminal device to monitor information for scheduling uplink data and/or downlink data transmission.

8. The terminal device according to claim 7, wherein the terminal device is further caused to:

stop the first timer in a case that the terminal device receives third information, wherein the third information comprises at least one of the following:

RRC release information, RRC resume information, RRC setup information, RRC reject information.

9. The terminal device according to claim 7, wherein, a duration of the first timer is longer than a duration of a timer T319, and the first timer is different from the timer T319.

10. The terminal device according to claim 9, wherein the terminal device is further caused to:

when the SDT process is triggered, start the first timer, wherein the first timer is used to achieve continuous inactive-state small data transmission.

11. The terminal device according to claim 7, wherein the first information further comprises indication information for indicating whether further transmission of uplink small data and/or downlink small data is expected.

12. A chip, comprising: a processor, configured to call and run a computer program from a memory to cause a terminal device installed with the chip to execute the following operations:

sending first information during running of a first timer, wherein the terminal device is in an inactive state, the first information comprises user data, the user data is data transmitted in a small data transmission (SDT) process, and the first timer is used to represent a time window of radio resource control (RRC) connection establishment resume and/or to represent a time window for the terminal device to monitor information for scheduling uplink small data and/or downlink small data transmission, wherein the first information further comprises an RRC resume request (RRCResumeRequest); and restarting the first timer in a case that the terminal device receives second information after the first information, wherein the second information is used to schedule the terminal device to transmit uplink data and/or receive downlink data in the inactive state, wherein the first information is transmitted by the terminal device through a configured grant (CG) resource;

wherein the first timer is used to represent the time window of RRC connection establishment resume, the terminal device installed with the chip is further caused to execute the following operations:

starting or restarting a second timer in a case that the terminal device receives the second information after the first information, wherein the second timer is used to represent a time window for the terminal device to monitor information for scheduling uplink data and/or downlink data transmission.

13. The chip according to claim 12, wherein the terminal device installed with the chip is further caused to execute the following operations:

stopping the first timer in a case that the terminal device receives third information, wherein the third information comprises at least one of the following:

RRC release information, RRC resume information, RRC setup information, RRC reject information.

14. The chip according to claim 12, wherein, a duration of the first timer is longer than a duration of a timer T319, and the first timer is different from the timer T319.

15. The chip according to claim 14, wherein the terminal device installed with the chip is further caused to execute the following operations:

when the SDT process is triggered, starting the first timer, wherein the first timer is used to achieve continuous inactive-state small data transmission.

16. The chip according to claim 12, wherein the first information further comprises indication information for indicating whether further transmission of uplink small data and/or downlink small data is expected.

* * * * *